(12) United States Patent
Kreuzer et al.

(10) Patent No.: US 9,768,990 B2
(45) Date of Patent: Sep. 19, 2017

(54) DEVICE FOR MANIPULATING INTERFACE SIGNALS

(75) Inventors: Stephan Kreuzer, Surberg-Ettendorf (DE); Elmar Mayer, Nussdorf (DE); Udo Ollert, Kirchweidach (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 359 days.

(21) Appl. No.: 13/188,240

(22) Filed: Jul. 21, 2011

(65) Prior Publication Data

US 2012/0030390 A1 Feb. 2, 2012

(30) Foreign Application Priority Data

Jul. 28, 2010 (DE) ......................... 10 2010 038 552

(51) Int. Cl.
*G06F 13/00* (2006.01)
*H04L 25/45* (2006.01)
(Continued)

(52) U.S. Cl.
CPC .......... *H04L 25/45* (2013.01); *G05B 19/0428* (2013.01); *G05B 19/406* (2013.01);
(Continued)

(58) Field of Classification Search
CPC ... H04L 25/45; G05B 19/0428; G05B 19/406; G05B 19/414; G05B 23/0256; H04Q 9/00
(Continued)

(56) References Cited

U.S. PATENT DOCUMENTS 5,001,712 A * 3/1991 Splett .................. G06F 11/2215
714/41
5,363,379 A * 11/1994 Eckenrode ............ G06F 11/221
714/703

(Continued)

FOREIGN PATENT DOCUMENTS

DE          100 18 206          10/2001
DE       10 2006 008 539          8/2007
(Continued)

OTHER PUBLICATIONS

Musa, L., "FPGAS in high energy physics experiments at CERN," Field Programmable Logic and Applications, 2008. FPL 2008. International Conference on , vol., no., pp. 2,2, Sep. 8-10, 2008.*

(Continued)

*Primary Examiner* — Paul R Myers
(74) *Attorney, Agent, or Firm* — Andrews Kurth Kenyon LLP

(57) ABSTRACT

A device for manipulating interface signals includes a slave interface, which is connectable to a master interface of a control device, a master interface, which is connectable to a slave interface of a measuring device, and a circuit configuration, which is supplied with at least one data-input signal per interface, and which outputs a corresponding data-output signal per data-input signal to the respective other interface. The circuit configuration includes at least one manipulation unit, to which a data-input signal and a substitute-data signal are supplied and which outputs a corresponding data-output signal, as well as a protocol unit, to which at least one protocol-relevant interface signal is supplied and which, based on manipulation rules and information received with the at least one protocol-relevant interface signal, chooses when the at least one manipulation unit outputs the corre- (Continued)

sponding data-input signal or the substitute-data signal as data-output signal.

16 Claims, 4 Drawing Sheets

(51) Int. Cl.
    *G05B 19/042*     (2006.01)
    *G05B 19/406*     (2006.01)
    *G05B 19/414*     (2006.01)
    *G05B 23/02*     (2006.01)
    *H04Q 9/00*     (2006.01)

(52) U.S. Cl.
    CPC ....... *G05B 19/414* (2013.01); *G05B 23/0256* (2013.01); *H04Q 9/00* (2013.01); *H04Q 2209/43* (2013.01); *H04Q 2209/75* (2013.01)

(58) Field of Classification Search
    USPC .......................................................... 710/110
    See application file for complete search history.

(56) References Cited

U.S. PATENT DOCUMENTS

| | | | |
|---|---|---|---|
| 5,687,103 A | | 11/1997 | Hagl et al. |
| 5,932,801 A | * | 8/1999 | Akishita ............... G01M 15/12 701/111 |
| 5,966,925 A | * | 10/1999 | Torikai ..................... F02C 7/26 60/778 |
| 6,886,126 B1 | * | 4/2005 | Grivna .................. H03M 13/03 714/752 |
| 6,904,380 B1 | * | 6/2005 | Brayton et al. ................ 702/108 |
| 7,496,434 B2 | * | 2/2009 | Fossen et al. .................. 701/21 |
| 7,818,103 B2 | * | 10/2010 | Johansen et al. ............... 701/22 |
| 2006/0111855 A1 | * | 5/2006 | Johansen et al. ............... 702/67 |
| 2007/0100478 A1 | * | 5/2007 | Egeland et al. ................ 700/45 |
| 2007/0208977 A1 | * | 9/2007 | Clark ............... G01R 31/31856 714/728 |
| 2007/0250227 A1 | * | 10/2007 | Fossen et al. .................. 701/21 |
| 2011/0078526 A1 | | 3/2011 | Mohr et al. |

FOREIGN PATENT DOCUMENTS

| | | |
|---|---|---|
| DE | 10 2008 027 895 | 2/2010 |
| EP | 0 171 579 | 2/1986 |
| EP | 0 660 209 | 6/1995 |
| WO | WO 2004059411 A1 * 7/2004 | ............... G05D 1/02 |

OTHER PUBLICATIONS

European Search Report, dated Oct. 4, 2012, issued in corresponding European Patent Application No. 11164538.8.

\* cited by examiner

US 9,768,990 B2

DEVICE FOR MANIPULATING INTERFACE SIGNALS

CROSS-REFERENCE TO RELATED APPLICATIONS

The present application claims priority to Application No. 10 2010 038 552.2, filed in the Federal Republic of Germany on Jul. 28, 2010, which is expressly incorporated herein in its entirety by reference thereto.

FIELD OF THE INVENTION

The present invention relates to a device for manipulating interface signals and to a control device having a device for manipulating interface signals.

BACKGROUND INFORMATION

Measuring devices which make digital measured values available are being used increasingly in automation technology. In the field of numerical controls, which are used for controlling machine tools, for example, this is true especially for position-measuring devices for measuring linear or rotary movements. Position-measuring devices which generate digital (absolute) measured values are referred to as absolute position-measuring devices.

Primarily serial data interfaces are used for transmitting absolute position values, since they make do with only a few data-transmission lines, and nevertheless, have high data-transmission rates. Particularly advantageous are what are referred to as synchronous serial interfaces, which have one unidirectional or bidirectional data line and one clock line. Data packets are transmitted via the data line in synchronism with a clock signal on the clock line. A multitude of standard digital interfaces have gained acceptance in automation technology. For example, popular representatives for synchronous serial interfaces are the EnDat interface of HEIDENHAIN, and a further is known under the name SSI. In addition, asynchronous serial interfaces such as Hiperface are also prevalent.

The SSI interface is described, for example, in European Published Patent Application No. 0 171 579. It is a synchronous serial data interface having one unidirectional data line and one unidirectional clock line. Position values are read out from a position-measuring device in synchronism with a clock signal on the clock line.

On the other hand, European Patent No. 0 660 209 describes the fundamentals of the EnDat interface. It is likewise a synchronous serial interface which, however, besides the unidirectional clock line, has a bidirectional data line. It is thereby possible to transmit data in both directions—from the numerical control to the position-measuring device and from the position-measuring device to the numerical control. The data is transmitted in synchronism with a clock signal on the clock line, as well.

Meanwhile, besides the pure data, (e.g., the position values in the case of position-measuring devices), additional data is also transmitted via digital measuring-device interfaces, a few examples of which are: speed; acceleration; temperature in the measuring device; second, independently generated position value; and status information (warning signals, error signals, etc.).

Particularly in view of the operational safety of automation systems, it is necessary to test the reaction of the system to fault conditions, which are reflected in the data exchanged between the control and the measuring device. An example of this is that the control requests position values from a position-measuring device at defined time intervals via the digital measuring-device interface. The position values are transmitted in the form of data packets to the control. To check whether the instantaneous position value is also an actually newly formed position value, the data packet also contains a second position value, which was formed in the measuring device independently of the first position value and has a defined mathematical relation to it. For example, the two position values differ by an offset, which is known to the control. By comparing the two position values, it may be ascertained in the control whether the offset is actually present or not. In the first case, the data was correctly formed and transmitted; in the second case, an error has occurred either in the measuring device or on the transmission path.

However, whether the control actually recognizes such an error and reacts properly is very difficult to check in practice, e.g., in the case of a actual system. Theoretically, of course, the possibility exists to manipulate the measuring device appropriately, i.e., to substitute manipulated measuring devices for the built-in devices. At the latest, this procedure fails because of high expenditure when several measuring devices or several failure situations are to be tested.

SUMMARY

Example embodiments of the present invention provide a device which permits an easy diagnostic analysis.

According to an example embodiment of the present invention, a device for manipulating interface signals includes: a slave interface connectable to a master interface of a control device; a master interface connectable to a slave interface of a measuring device; and a circuit configuration suppliable with at least one data-input signal per interface and adapted to output a corresponding data-output signal per data-input signal to a respective other interface. The circuit configuration includes at least one manipulation unit, to which a data-input signal and a substitute-data signal are suppliable and adapted to output a corresponding data-output signal, and a protocol unit, to which at least one protocol-relevant interface signal is suppliable and adapted to choose, based on manipulation rules and information received with the at least one protocol-relevant interface signal, when the at least one manipulation unit outputs the corresponding data-input signal or the substitute-data signal as an data-output signal.

The device may include an operator interface connectable to an operator-control unit and adapted to at least one of (a) program and (b) operate the circuit configuration.

The circuit configuration may include a manipulation memory adapted to store the manipulation rules.

The circuit configuration may include a manipulation memory adapted to store the manipulation rules, and the manipulation memory may be writable by the operator interface.

The device may further include operator-control elements, e.g., a keypad, adapted to operate the device.

The device may further include a display unit.

The measuring device may include a position measuring device adapted to measure at least one of (a) an angle of rotation and (b) a number of revolutions of a shaft.

The slave interface may be connectable to the master interface of the control device by a cable, and the master interface may be connectable to the slave interface of the measuring device by a cable.

The circuit configuration may include at least one of (a) a Field Programmable Gate Array (FPGA) and (b) a microcontroller.

According to an example embodiment of the present invention, a control device includes: at least one interface controller including a master interface; and a device adapted to manipulate interface signals. The device includes: a slave interface connectable to the master interface of the interface controller; a master interface connectable to a slave interface of a measuring device; and a circuit configuration suppliable with at least one data-input signal per interface and adapted to output a corresponding data-output signal per data-input signal to a respective other interface. The circuit configuration includes at least one manipulation unit, to which a data-input signal and a substitute-data signal are suppliable and adapted to output a corresponding data-output signal, and a protocol unit, to which at least one protocol-relevant interface signal is suppliable and adapted to choose, based on manipulation rules and information received with the at least one protocol-relevant interface signal, when the at least one manipulation unit outputs the corresponding data-input signal or the substitute-data signal as an data-output signal.

According to an example embodiment of the present invention, a system includes: a control device including a master interface; a measuring device including a slave interface; and a device adapted to manipulate interface signals. The device includes: a slave interface connected to the master interface of the control device; a master interface connected to the slave interface of a measuring device; and a circuit configuration suppliable with at least one data-input signal per interface and adapted to output a corresponding data-output signal per data-input signal to a respective other interface. The circuit configuration includes at least one manipulation unit, to which a data-input signal and a substitute-data signal are suppliable and adapted to output a corresponding data-output signal, and a protocol unit, to which at least one protocol-relevant interface signal is suppliable and adapted to choose, based on manipulation rules and information received with the at least one protocol-relevant interface signal, when the at least one manipulation unit outputs the corresponding data-input signal or the substitute-data signal as an data-output signal.

Further features and aspects of example embodiments of the present invention are described in more detail below with reference to the appended Figures.

DETAILED DESCRIPTION

Figure 1:
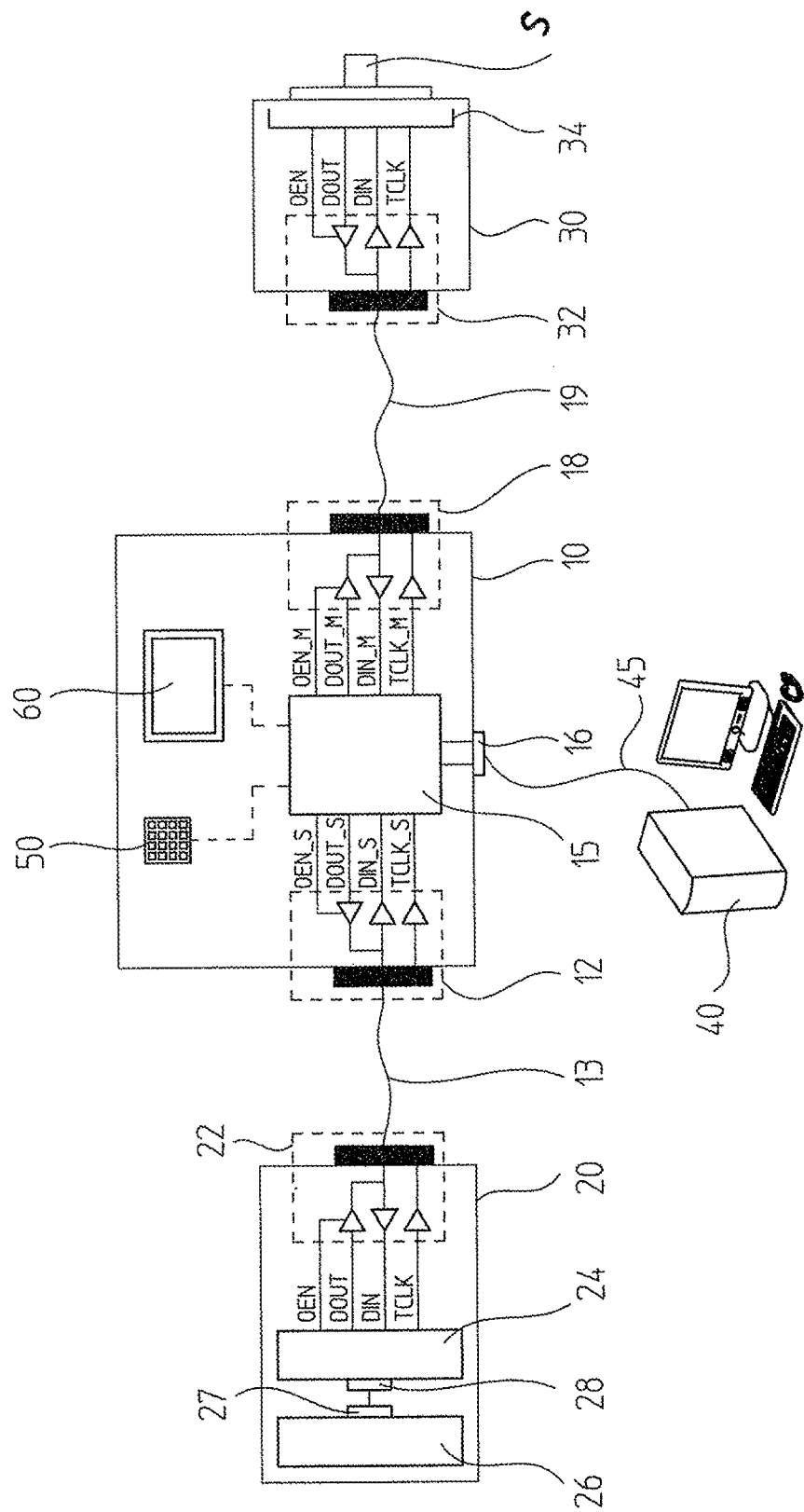
FIG. 1 shows a device according to an example embodiment of the present invention, which is arranged between a control device and a position-measuring device.

FIG. 1 shows a device 10 for manipulating interface signals, which is situated between a control device 20 and a measuring device 30. Control device 20 may be any device of automation engineering or drive engineering that has at least one serial interface capable of communicating with a measuring device connected to the interface. Examples of this are position indicators, numerical controls (NC), and programmable logic controls (PLC). In the following exemplary embodiments, a numerical control 20 is used representatively as the control device 20. In particular, the measuring device is a position-measuring device 30, e.g., for measuring the angle of rotation of and/or the number of revolutions performed by a shaft S.

For the exchange of data with numerical control 20, device 10 includes a slave interface 12 which is connected by a first interface cable 13 to a master interface 22 of an interface controller 24 of numerical control 20. The device further includes a master interface 18 which is connected by a second interface cable 19 to a slave interface 32 of position-measuring device 30. The central unit of device 10 is a circuit configuration 15, which processes interface signals. The circuit configuration 15 is described in greater detail below in connection with FIG. 2.

The interface cables and the interfaces are equipped in customary manner with suitable plug-in connectors, so that a device hereof may also easily be inserted between numerical control 20 and position-measuring device 30 in the case of pre-installed automation systems or machine tools by, for example, breaking the connection between master interface 22 of numerical control 20 and slave interface 32 of position-measuring device 30, and producing a connection between master interface 22 of numerical control 20 with slave interface 12 of device 10, as well as between slave interface 32 of position-measuring device 30 and master interface 18 of device 10. For the sake of completeness, it should also be mentioned that power is usually supplied to position-measuring device 30 by the interface cable, as well, and a suitable connection is produced in device 10. This power supply may also be utilized for the operation of device 10.

Furthermore, in a conventional manner, the interfaces may include driver and receiver modules in order, for example, to convert interface signals which are generated and processed as simple, single-ended, digital signals in numerical control 20, device 10 and position-measuring device 30, into signals which are suitable for interference-proof transmission over greater distances. Driver and receiver modules which allow differential transmission of digital signals according to the RS-485 standard are especially widespread. The conversion of digital interface signals into optical signals which are transmitted via optical fibers is considered advantageous, as well.

A control unit 26, which is connected via an application interface 27, 28 to interface controller 24, determines in numerical control 20 which data is requested from position-measuring device 30 or transmitted to position measuring device 30. In this context, interface controller 24 is used as a translation unit which converts communication instructions of general application interface 27, 28 into interface signals of special master interface 22 of numerical control 20. The provision of requested data and the processing of received data are carried out in position-measuring device 30 in a measuring unit 34.

Control unit 26 is a program-controlled unit, especially based on a microcontroller or microprocessor. Examples for functions of control unit 26 are the readout and display of position values, as well as the controlling of complex control loops, in that it requests actual values from measuring devices, e.g., position-measuring devices 30, and from these actual values, ascertains setpoint values for the control of drives.

In the normal state, device 10 is advantageously switched to transparent, that is, input signals which arrive at one of interfaces 12, 18 of device 10 are output as corresponding output signals at the respective other interface 12, 18. An interference-free operation of the system controlled by numerical control 20 is thereby ensured, even if device 10 is present.

Figure 4:
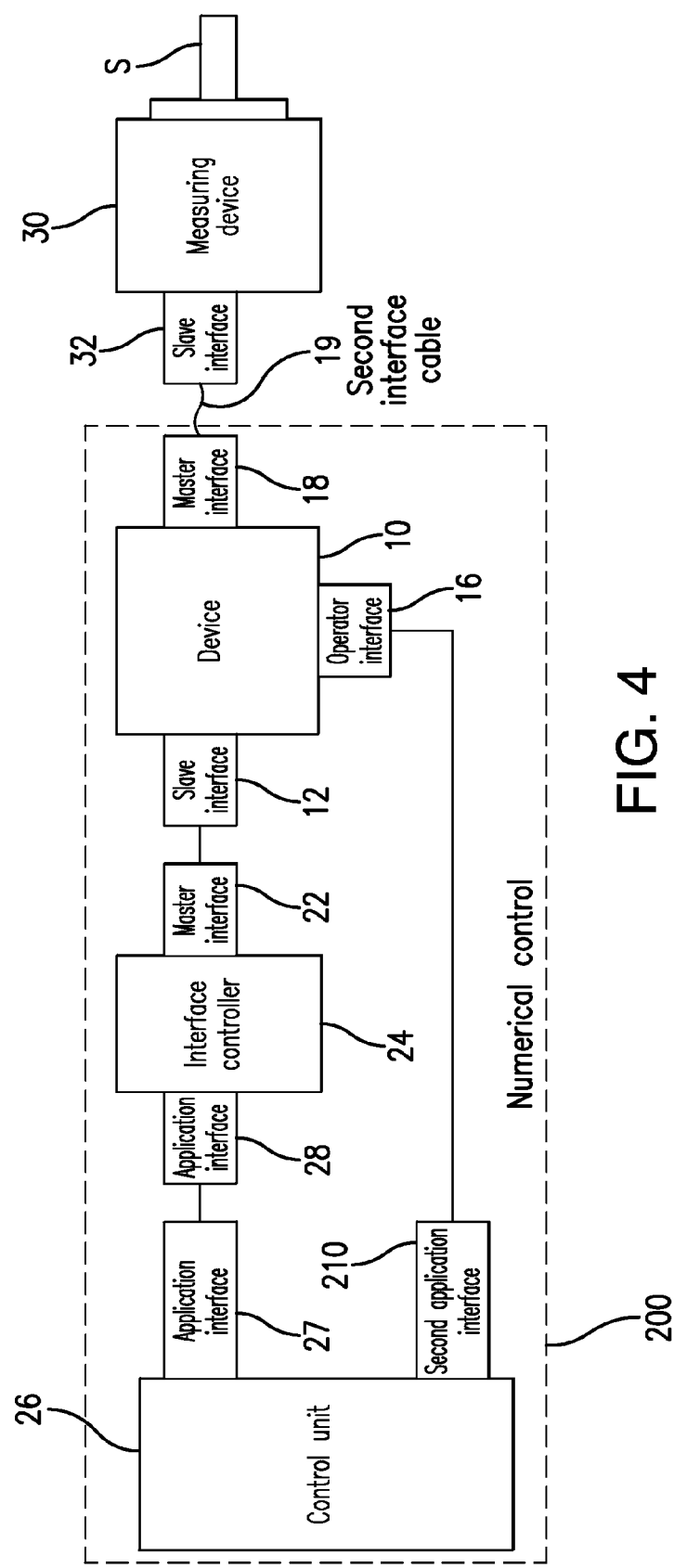
FIG. 4 shows a further exemplary embodiment, in which a device is integrated into a control device.

Also provided on device 10 is an operator interface 16, to which an operator-control unit 40 is connectable with the aid of a further interface cable 45. Operator interface 16 may be used both for programming and for controlling the functions of circuit configuration 15. Although it may be of the same type as slave interface 12 or master interface 18, it is not restricted to that. A few examples for the implementation of operator interface 16 would be the I2C-, SPI- or JTAG-interface. It is especially advantageous if a conventional personal computer, especially a laptop or notebook, is used as operator-control unit 40. Such devices are usually provided with USB or Ethernet interfaces, which likewise are suitable as operator interface 16. Moreover, wireless interfaces are also usable, for instance, optical according to the IrDA standard or via radio link according to the Bluetooth or ZigBee standard. Instead of using a separate operator-control unit 40, it is also possible to operate device 10 via an additional interface of control device 20. Similar advantages as in the case of the exemplary embodiment described below with reference to FIG. 4 are thereby attained.

Optionally, operator-control elements 50, e.g., implemented as a keypad, and a display unit 60 in the form of a multi-line display, via which circuit configuration 15 is programmable and/or operable, may also be disposed in device 10. In this manner, complex operator-control functions, e.g., activation of test functions, selection of the measuring-device model, version of the interface, etc., may be performed directly on device 10, so that the device is operable as an autonomous unit that may be made available to service personnel, for example, in order to check an installed system at the location of a customer.

In the present example, master interface 22 of numerical control 20 is an EnDat interface. Therefore, the physical data transmission, as described in European Patent No. 0 660 209 mentioned above, is carried out according to the RS-485 standard in the form of differential signals via two pairs of lines, the first pair of lines being used for the bidirectional transmission of data and the second pair of lines being used for the unidirectional transmission of a clock signal. The data is transmitted in synchronism with the clock signal. For this interface, three interface signals must be managed internally: a clock signal TCLK, a data-input signal DIN and a data-output signal DOUT. The setting of the data direction, thus, whether the data-output signal is output actively, is accomplished via an enable signal OEN that is switched in accordance with the data-transmission protocol.

In the following, slave interface signals, which are used for the communication of slave interface 12 of device 10 with master interface 22 of numerical control 20, are denoted as slave data-input signal DIN_S, slave data-output signal DOUT_S, slave clock signal TCLK_S and slave enable signal OEN_S. Analogously, master interface 18 of device 10 communicates with slave interface 32 of position-measuring device 30 via master interface signals, particularly via a master data-input signal DIN_M, a master data-output signal DOUT_M, a master clock signal TCLK_M and a master enable signal OEN_M. Corresponding interface signals are, in each case, slave data-input signal DIN_S and master data-output signal DOUT_M, slave clock signal TCLK_S and master clock signal TCLK_M, as well as master data-input signal DIN_M and slave data-output signal DOUT_S.

Figure 2:
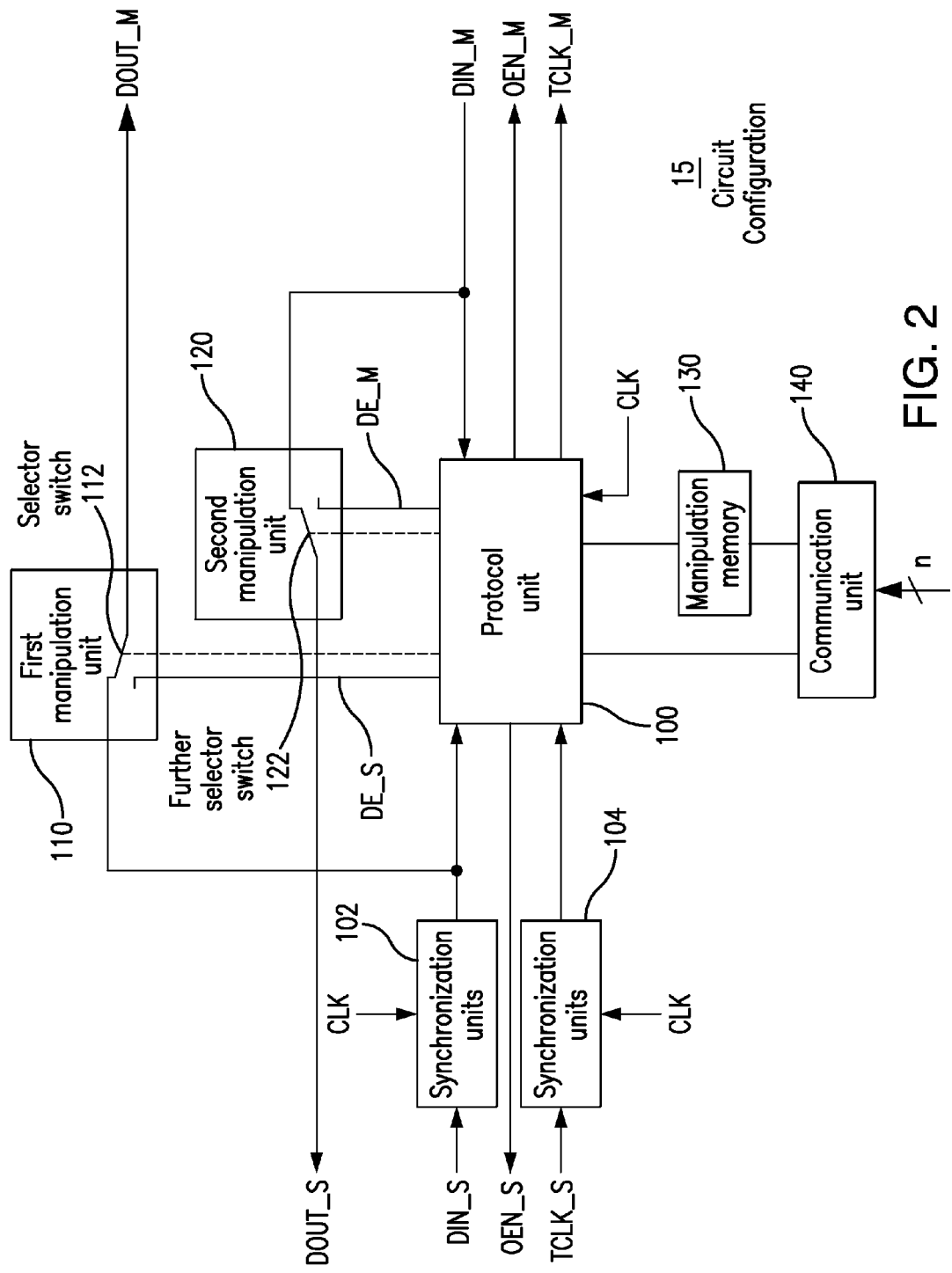
FIG. 2 shows a block diagram of a circuit configuration which is included in a device according to an example embodiment of the present invention.

FIG. 2 shows a block diagram of a circuit configuration 15. Protocol-relevant interface signals, e.g., signals which are suitable for detecting and processing the data-transmission protocol, are supplied to a central protocol unit 100. In the present example, they are slave data-input signal DIN_S, slave clock signal TCLK_S and, if response data from position-measuring device 30 is also to be processed, master data-input signal DIN_M. As a function of the instantaneous data direction, which is obtained from the protocol sequence, protocol unit 100 also generates slave enable signal OEN_S and master enable signal OEN_M. Moreover, protocol unit 100 also outputs master clock signal TCLK_M via master interface 18 to position-measuring device 30.

In addition to being supplied to protocol unit 100, slave data-input signal DIN_S is also supplied to a first manipulation unit 110 that outputs master data-output signal DOUT_M. Using a selector switch 112 controlled by protocol unit 100, it is possible to select whether first manipulation unit 110 outputs slave data-input signal DIN_S or a slave substitute-data signal DE_S, generated by protocol unit 100, as master data-output signal DOUT_M. In other words, the setting of selector switch 112 in first manipulation unit 110 determines whether the data or commands, originally transmitted by numerical control 20, reach position-measuring device 30, or substitute data generated by protocol unit 100. In this manner, individual data bits, or even entire bit sequences, are able to be manipulated or interchanged.

In the opposite data direction, master data-input signal DIN_M is supplied to a second manipulation unit 120, which outputs slave data-output signal DOUT_S. In second manipulation unit 120, a further selector switch 122 determines whether precisely this master data-input signal DIN_M or an alternative master substitute-data signal DE_M, generated in protocol unit 100, is output as slave data-output signal DOUT_S. A bit-by-bit manipulation of the data, which is transmitted by position-measuring device 30 to numerical control 20, is possible here, as well.

Protocol unit 100 may be arranged as a status-driven automatic unit that recognizes information, especially commands, which arrive with the protocol-relevant interface signals from numerical control 20, and manipulates the data as a function of this information and according to predefined manipulation rules. It operates in synchronism with a working clock-pulse signal CLK, which is either generated in circuit configuration 15, or is supplied to it from outside. Since the interface signals which arrive at circuit configuration 15 from the direction of numerical control 20—specifically slave clock signal TCLK_S and slave data-input signal DIN_S in this example—are asynchronous with respect to working clock-pulse signal CLK, it is advantageous to already synchronize them with working clock-pulse signal CLK at the input of circuit configuration 15 with the aid of synchronization units 102, 104. In this context, these signals are merely time-delayed, but otherwise remain largely unaltered. Since the response data of position-measuring device 30 thereby also arrives in delayed fashion at numerical control 20, such a delay affects numerical control 20 like the use of longer interface cables, 13, 19. In order to be able to process the interface signals, working clock-pulse signal CLK must have the same or a higher frequency than the maximum frequency to be expected of slave clock signal TCLK_S. In general, the higher the frequency of working clock-pulse signal CLK, the smaller the time delay of the interface signals. Given a maximum frequency of slave clock signal TCLK_S of 10 MHz, a frequency of working clock-pulse signal CLK in the range of 40 to 100 MHz may be provided.

For example, the manipulation rules may be stored permanently in the status-driven automatic unit. However, a manipulation memory 130 whose contents are programmable via a communication unit 140 that communicates with operator-control unit 40 via operator interface 16 by a number of n control signals may be provided. Both manipulation rules and substitute data for generating substitute-data signals DE_S, DE_M may be stored in manipulation memory 130. In this manner, device 10 may be adapted flexibly to altered requirements.

Moreover, operator interface 16 may be used to first provide modifications in the data exchange between numerical control 20 and position-measuring device 30, that is, to define the type and extent of the manipulations. For example, this may be accomplished via a computer program which is executable in operator-control unit 40 and offers a menu-driven selection of various options.

For example, a programmable component, e.g., a FPGA (Field Programmable Gate Array) may be used as circuit configuration 15. Such components are able to be reprogrammed at any time, and are therefore best suited to react to changes and/or expansions of the manipulation possibilities of device 10. Microcontrollers are likewise particularly well suited as circuit configuration 15, since they are also easy to reprogram and to adapt to altered conditions. For example, circuit configuration 15 may be programmed via operator interface 16.

Figure 3:
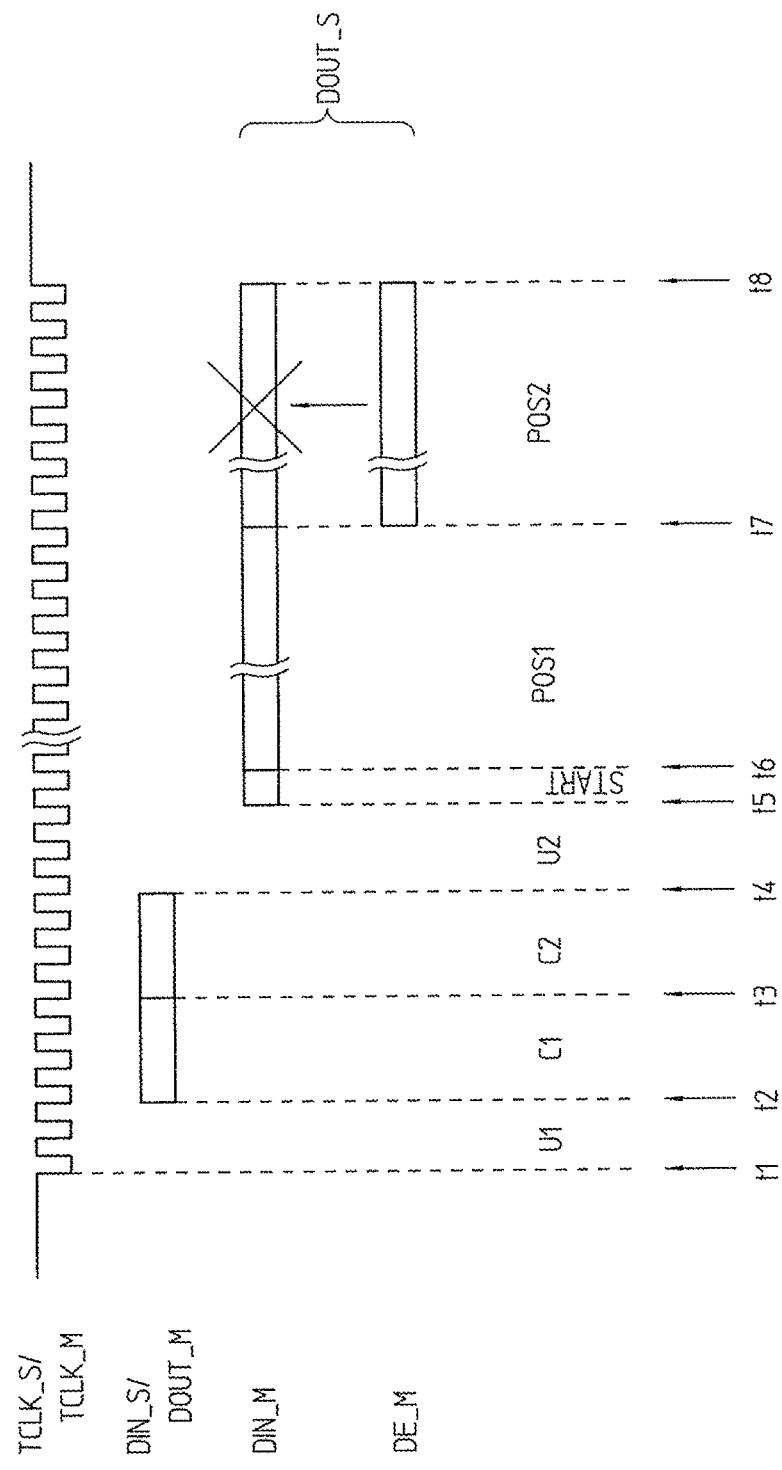
FIG. 3 shows a simplified data-transmission sequence to illustrate the functioning principle of a device according to an example embodiment of the present invention.

FIG. 3 shows a simplified data-transmission sequence to illustrate the functioning method of device 10. In particular, slight time delays, caused by the processing or synchronization of the interface signals in circuit configuration 100, are not shown. The transmission of a position-request command from numerical control 20 to position-measuring device 30 is shown, whereupon position-measuring device 30 transmits instantaneous position data to numerical control 20. To increase transmission reliability, first of all, the position-request command is redundant. For example, it includes a first command block C1 and a second command block C2, made up, for example, of 3 bits each, second command block C2 merely repeating first command block C1 identically or in inverted fashion. Secondly, as already mentioned above, as response to the position-request command, position-measuring device 30 transmits two position values POS1 and POS2, which have the mathematical relation POS2=POS1+OFFSET to each other. Position values POS1 and POS2 are generated independently of each other in position-measuring device 30, which means by comparing position values POS1, POS2 with the known mathematical relation, numerical control 20 is able to determine whether the generation and transmission of position values POS1, POS2 is error-free. If an error is determined, numerical control 20 must react determinately, e.g., by outputting an alarm signal or by shutting down the system ("safe stop") in which position-measuring device 30 is operated.

As an additional measure for increasing transmission reliability, position values POS1, POS2 may in each instance be terminated by a CRC code.

As a manipulation rule for the position-request command described above, it is stored in device 10 that instead of actual second position value POS2 transmitted by position-measuring device 30, an alternative, altered second position value POS2 should be forwarded to numerical control 20.

The manipulation rule thus determines at what point in time second manipulation unit 120 must be switched over in order to output master substitute-data signal DE_M, instead of master data-input signal DIN_M, as slave data-output signal DOUT_S. The manner in which second position value POS2 should be altered may likewise be specified in the manipulation rule. The protocol unit provides a master substitute-data signal DE_M according to these stipulations.

The manipulation rule may also include any further instructions as desired, for instance, whether the manipulation is carried out only in response to the first occurrence of a command, or several times, or even each time when this command is recognized. Furthermore, it may be established whether the manipulation is always carried out the same or differently each time according to a formation specification for substitute-data signal DE_M, DE_S.

At this juncture, it should be pointed out specifically that manipulation rules do not necessarily have to be assigned to commands that are sent within the framework of the data-transmission protocol from numerical control 20 to position-measuring device 30. Rather, a manipulation rule may be assigned to any information at all which arrives at device 10 or circuit configuration 100 from numerical control 20, or perhaps from position-measuring device 30. In the simplest case, the onset of the clock signal, thus, the beginning of a data transmission, may already be evaluated as information to which a manipulation rule is assigned.

The first line of the data-transmission sequence illustrated in FIG. 3 shows slave clock signal TCLK_S arriving at circuit configuration 15 from numerical control 20, and (disregarding a delay), master clock signal TCLK_M forwarded by circuit configuration 15 to position-measuring device 30.

The second line shows slave data-input signal DIN_S, which includes command blocks C1 and C2 and is forwarded—unaltered in this example—as master data-output signal DOUT_M via first manipulation unit 110 in the direction of position-measuring device 30.

In the third line, master data-input signal DIN_M is shown, which includes the response data from position-measuring device 30, especially position values POS1 and POS2, possibly terminated with a CRC code.

Finally, the fourth line shows a master substitute-data signal DE_M which is generated by protocol unit 100, and in this example, is used to replace second position value POS2 sent by position-measuring device 30. When generating master substitute-data signal DE_M, it must be taken into consideration whether or not a CRC code is necessary.

The data signal (either master data-input signal DIN_M or master substitute-data signal DE_M) selected in each case by second manipulation unit 120 is forwarded as slave data-output signal DOUT_S to numerical control 20.

The time sequence is as follows: After the activating of slave clock signal TCLK_S, initially the data direction is switched over. Assuming that in the idle state, slave enable signal OEN_S is switched to active and master enable signal OEN_M is switched to passive, in a first switchover time U1 between points in time t1 and t2, protocol unit 100 first switches slave enable signal OEN_S to passive and then switches master enable signal OEN_M to active. The switchover is performed in time-stacked fashion in order to avoid data collisions.

As of point in time t2, first command block C1 is transmitted, followed, as of point in time t3, by second command block C2.

The transmission of second command block C2 is ended at point in time t4. By comparing command blocks C1, C2, protocol unit 100 is able to determine whether the transmission of the command is error-free.

At point in time t4 at the latest, protocol unit 100 has sufficient information to be able to determine whether interface signals should be manipulated, that is, whether, as in this example, a manipulation rule exists for this command. The manipulation rule is either defined in protocol unit 100 or stored in manipulation memory 130. It is also possible for this information to be transmitted to protocol unit 100 from operator-control unit 40 via operator interface 16 and communication unit 140.

The transmission of the command is followed by a second switchover time U2 from point in time t4 to point in time t5, in which the data direction is switched over, in particular, the protocol unit switches master enable signal OEN_M to passive and slave enable signal OEN_S to active.

As of point in time t5, the transmission of the response data from position-measuring device 30 to numerical control 20 begins, in the course of which, first a start sequence START is transmitted, which, for example, is made up of one start bit, followed by several status bits that allow conclusions about the operating state of position-measuring device 30.

Following start sequence START, as of point in time t6, first position value POS1 is transmitted.

In accordance with the manipulation rule for the present command, at point in time t7, protocol unit 100 switches switching element 122 in second manipulation unit 120, so that starting from this point in time, master substitute-data signal DE_M, which is made available by protocol unit 100 as a function of the manipulation rule, is output as slave data-output signal DOUT_S to numerical control 20 instead of master data-input signal DIN_M.

At point in time t8, the data transmission is ended and protocol unit 100 goes back to the initial state.

As the example for a manipulation of the data traffic between master interface 22 of a numerical control 20 and the slave interface of a position-measuring device 30, described in conjunction with FIG. 3, shows, a device 10, i.e., a circuit configuration 15, offers various possibilities for checking the reaction of numerical control 20 to supposedly faulty data transmitted by position-measuring device 30. It is especially advantageous that neither numerical control 20 nor position-measuring device 30 must be modified for this.

A few further examples for manipulations of the data traffic are described below.

If, instead of a second position value POS2, a temperature value which indicates the temperature in the position-measuring device is transmitted as additional information, then, for example, by replacing the actually measured temperature value with an alternative temperature value, an overheating of position-measuring device 30 may be predefined and the reaction of numerical control 20 to it may be checked.

If the additional information is a value dependent on changes in position, e.g., a speed value, then by manipulating it, it is possible to check whether numerical control 20 detects a deviation from a speed value, which is calculated with the aid of two successive position values and the known time between two position queries in numerical control 20, and the speed value ascertained in position-measuring device 30, and reacts to it appropriately.

By altering individual bits, e.g., in second command block C2, a disturbance of the data transmission between numerical control 20 and position-measuring device 30 may be simulated.

If configuration data is transmitted by numerical control 20 to position-measuring device 30, by manipulating the data, a faulty configuration of position-measuring device 30 is able to be generated.

Likewise, data, which is stored in memory units in the position-measuring device (e.g., what is referred to as the electronic type label), if it is requested by numerical control 20, may be replaced by alternative data, and thus, for example, a different type of measuring device or a different version of the measuring device may be simulated.

FIG. 4 shows a further exemplary embodiment, in which a device 10 is integrated into a control device, e.g., a numerical control 200. The reference numerals of components which were already described in connection with the exemplary embodiment in FIG. 1 are used in FIG. 4.

Master interface 22, which interface controller 24 of numerical control 200 provides, is already connected in the housing of numerical control 200 to slave interface 12 of device 10. In the simplest case, corresponding interfaces are connected directly, thus, without plug-in connectors and/or driver modules. Master interface 18 of device 10 becomes the master interface of numerical control 200, to which a measuring device 30, particularly a position-measuring device 30 may be connected.

For the control and possibly programming of device 10, operator interface 16 is connected to a second application interface 210 of control unit 26. Preferably wire-bound interfaces are used as second application interface 210 and operator interface 16. It is especially advantageous if the interface connection between second application interface 210 and operator interface 16 is identical to the interface connection of application interface 27, 28 between control unit 26 and interface controller 24, since control unit 26 usually already makes several application interfaces available, and thus a standard interface may be used for device 10.

The main difference compared to the first exemplary embodiment is that device 10 is always available. Therefore, for example, it is possible at any time for the operator of a machine tool to have an auto-test program executed, which checks safety-related functions in order to determine whether the system still satisfies the safety level required. Such auto-test programs may also be started in automated fashion, for instance, at defined time intervals or at the beginning of a new machining program. Suitable auto-test programs may be made available by the manufacturer to the operator of a system controlled by numerical control 20.

Device 10 may be implemented as an expansion module with which a numerical control 200 may also be equipped later.

There is also the possibility of implementing interface controller 24 and circuit configuration 15 in a single module, e.g., an FPGA, ASIC or microcontroller.

What is claimed is:

1. A device for manipulating interface signals, comprising:
   a slave interface connectable to a master interface of a control device and adapted to receive protocol-relevant interface signals from the control device;
   a master interface connectable to a slave interface of a measuring device and adapted to receive protocol-relevant interface signals from the measuring device; and
   a circuit configuration suppliable with at least one data-input signal per interface and adapted to output a corresponding data-output signal per data-input signal to a respective other interface, each data-input signal being included in a respective protocol-relevant interface signal;

wherein the circuit configuration includes at least one manipulation unit, to which a data-input signal and a substitute-data signal are input and adapted to output a corresponding data-output signal, and a protocol unit, to which the protocol-relevant interface signals are suppliable and adapted to choose, based on manipulation rules and based on information included in the protocol-relevant interface signals, whether the output signal that is output by the at least one manipulation unit consists of either (a) only the data-input signal that is input to the manipulation unit or (b) only the substitute-data signal that is input to the manipulation unit.

2. The device according to claim 1, further comprising an operator interface connectable to an operator-control unit and adapted to at least one of (a) program and (b) operate the circuit configuration.

3. The device according to claim 1, wherein the circuit configuration includes a manipulation memory adapted to store the manipulation rules.

4. The device according to claim 3, further comprising an operator interface connectable to an operator-control unit and adapted to at least one of (a) program and (b) operate the circuit configuration, the circuit configuration including a manipulation memory adapted to store the manipulation rules, the manipulation memory writable by the operator interface.

5. The device according to claim 1, further comprising operator-control elements adapted to operate the device.

6. The device according to claim 5, wherein the operator-control elements include a keypad.

7. The device according to claim 1, further comprising a display unit.

8. The device according to claim 1, wherein the measuring device includes a position measuring device adapted to measure at least one of (a) an angle of rotation and (b) a number of revolutions of a shaft.

9. The device according to claim 1, wherein the slave interface is connectable to the master interface of the control device by a cable and the master interface is connectable to the slave interface of the measuring device by a cable.

10. The device according to claim 1, wherein the circuit configuration includes at least one of (a) a Field Programmable Gate Array (FPGA) and (b) a microcontroller.

11. A method for operating a device for manipulating signals, comprising:
connecting a slave interface to a master interface of a control device;
connecting a master interface to a slave interface of a measuring device;
supplying, to a circuit configuration, protocol-relevant interface signals, including a data-input signal, from the slave interface and protocol-relevant interface signals, including a data-input signal, from the master interface;
(a) supplying, to a first manipulation unit of the circuit configuration, (i) the data-input signal from the slave interface and (ii) a first substitute data signal, and/or (b) supplying, to a second manipulation unit of the circuit configuration, (i) the data-input signal from the master interface and (ii) a second substitute data signal;
supplying, to a protocol unit of the circuit configuration, the protocol-relevant interface signals;
choosing, by the protocol unit based on manipulation rules and based on information included in the protocol-relevant interface signals, (a) whether the first manipulation unit outputs (i) the data-input signal from the slave interface or (ii) the first substitute data signal and/or (b) whether the second manipulation unit outputs (i) the data-input signal from the master interface or (ii) the second substitute data signal;
based on the choosing by the protocol unit, (a) outputting by the first manipulation unit a first data-output signal that consists of (i) only the data-input signal from the slave interface or (ii) only the first substitute data signal and/or (b) outputting by the second manipulation unit a second data-output signal that consists of (i) only the data-input signal from the master interface or (ii) only the second substitute data signal; and
(a) outputting, by the circuit configuration, the second data-output signal, consisting of (i) only the data-input signal from the master interface or (ii) only the second substitute data signal, to the slave interface, and/or (b) outputting, by the circuit configuration, the first data-output signal, consisting of (i) only the data-input signal from the slave interface or (ii) only the second substitute data signal; to the master interface.

12. A control device, comprising:
at least one interface controller including a master interface; and
a device adapted to manipulate interface signals, including:
a slave interface connectable to the master interface of the interface controller and adapted to receive protocol-relevant interface signals from the control device;
a master interface connectable to a slave interface of a measuring device and adapted to receive protocol-relevant interface signals from the measuring device; and
a circuit configuration suppliable with at least one data-input signal per interface and adapted to output a corresponding data-output signal per data-input signal to a respective other interface, each data-input signal being included in a respective protocol-relevant interface signal;
wherein the circuit configuration includes at least one manipulation unit, to which a data-input signal and a substitute-data signal are input and adapted to output a corresponding data-output signal, and a protocol unit, to which the protocol-relevant interface signals are suppliable and adapted to choose, based on manipulation rules and based on information included in the protocol-relevant interface signals, whether the output signal that is output by the at least one manipulation unit consists of either (a) only the data-input signal that is input to the manipulation unit or (b) only the substitute-data signal that is input to the manipulation unit.

13. The method according to claim 11, wherein the method is performed by the device recited in claim 12.

14. A system, comprising:
a control device including a master interface;
a measuring device including a slave interface; and
a device adapted to manipulate interface signals, including:
a slave interface connected to the master interface of the control device and adapted to receive protocol-relevant interface signals from the control device;
a master interface connected to the slave interface of a measuring device and adapted to received protocol-relevant interface signals from the measuring device; and a circuit configuration suppliable with at least one data-input signal per interface and adapted to output a corresponding data-output signal per data-input signal to a respective other interface, each data-input signal being included in a respective protocol-relevant interface signal;

wherein the circuit configuration includes at least one manipulation unit, to which a data-input signal and a substitute-data signal are input and adapted to output a corresponding data-output signal, and a protocol unit, to which the protocol-relevant interface signals are suppliable and adapted to choose, based on manipulation rules and based on information included in the protocol-relevant interface signals, whether the output signal that is output by the at least one manipulation unit consists of either (a) only the data-input signal that is input to the manipulation unit or (b) only the substitute-data signal that is input to the manipulation unit.

15. The method according to claim 11, wherein in the method is performed by the system recited in claim 14.

16. The method according to claim 11, wherein the method is performed by the device recited in claim 1.

* * * * *